United States Patent [19]

Kleinschuster et al.

[11] 4,066,620
[45] Jan. 3, 1978

[54] COPOLYESTER CAPABLE OF FORMING ANISOTROPIC MELT AND SHAPED ARTICLES THEREOF

[75] Inventors: Jacob John Kleinschuster, Wilmington; Terry Carl Pletcher, Hockessin, both of Del.

[73] Assignee: E. I. Du Pont de Nemours and Company, Wilmington, Del.

[21] Appl. No.: 601,074

[22] Filed: Aug. 1, 1975

[30] Foreign Application Priority Data

Apr. 29, 1975 Sweden .................................. 7504996

[51] Int. Cl.$^2$ ...................... C08G 63/18; C08G 63/66
[52] U.S. Cl. ................................ 260/47 C; 264/176 R; 264/176 F
[58] Field of Search ...................................... 260/47 C

[56] References Cited

U.S. PATENT DOCUMENTS

| | | | |
|---|---|---|---|
| 3,160,602 | 12/1968 | Kantor et al. | 260/47 |
| 3,160,605 | 12/1968 | Kantor et al. | 260/47 |
| 3,704,279 | 11/1972 | Ismail | 260/61 |
| 3,723,172 | 3/1973 | Ismail | 117/138.8 A |

*Primary Examiner*—Lester L. Lee

[57] ABSTRACT

This invention relates to a class of novel copolyesters derived from terephthalic acid and derivatives of methyl- or chlorohydroquinone and bis(4-hydroxyphenyl)ether, and to the fibers and other shaped articles prepared therefrom. Also comprehended by this invention are the novel, optically anisotropic copolyester melts from which these fibers can be prepared.

13 Claims, 1 Drawing Figure

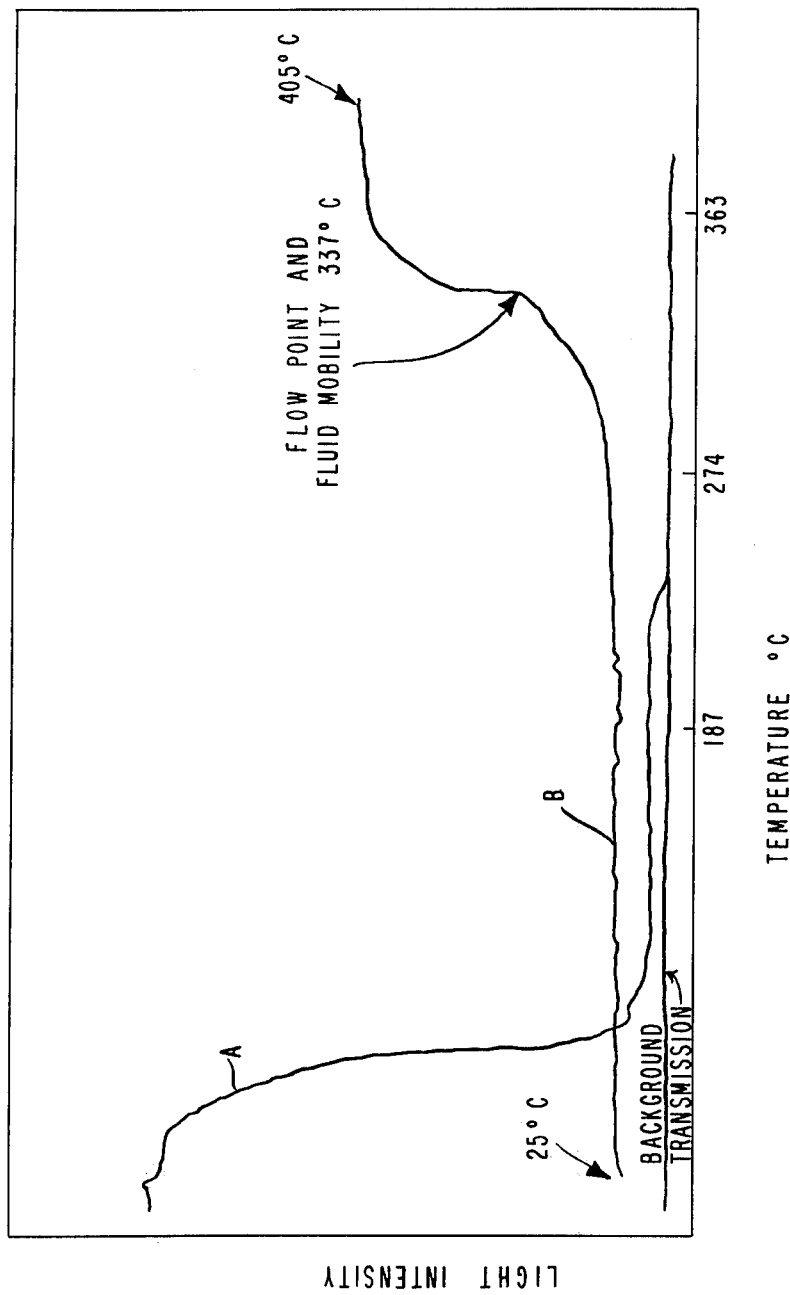

COPOLYESTER CAPABLE OF FORMING ANISOTROPIC MELT AND SHAPED ARTICLES THEREOF

BACKGROUND OF THE INVENTION

While numerous other polyesters have been prepared and evaluated, polyethylene terephthalate continues to be the singularly preferred polyester in current commercial use. This species is used to prepare a variety of products including films, textile filaments, tire cords, ropes, and other industrial and consumer products. The development of new polyesters having one or more properties superior to polyethylene terephthalate has been a worthwhile objective.

SUMMARY OF THE INVENTION

This invention provides novel, anisotropic-melt-forming copolyesters of fiber-forming molecular weight consisting essentially of units of the formula:

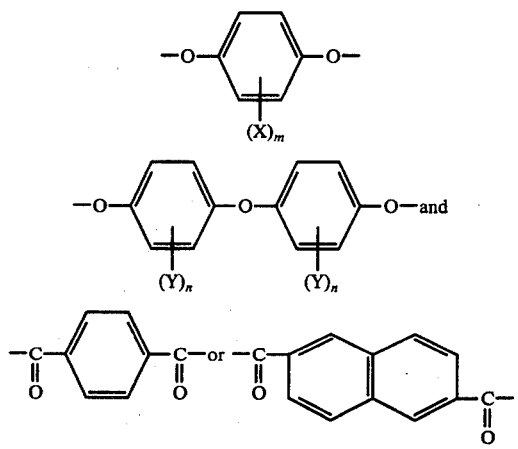

wherein X is selected from the group of chloro and methyl; m is 1 or 2; Y is methyl; n is 0 or 1; the mole ratio of formula I units to formula II units is within the range of from about 85/15 to 60/40. The total of formula I and II units is present in a substantially equimolar amount with formula III units.

Also comprehended by this invention are optically anisotropic melts and novel shaped articles of the copolyesters. Especially preferred are high strength fibers which are characterized by a desirable combination of properties including resistance to high temperatures and inrubber stability. Heat-treating processes of a defined nature enhance the properties of the oriented, as-spun fibers of this invention to produce fibers having tenacities of at least about 10 gpd. in combination with moduli exceeding about 150 gpd.

DRAWING

The FIGURE depicts intensity traces obtained as described herein for two different polyesters in the solid and melt states along with the background trace. One of the trace curves is of an instant copolyester yielding an anisotropic melt (Curve B) while the other trace curve is of a polyester which yields an isotropic melt (Curve A).

DESCRIPTION OF THE PREFERRED EMBODIMENTS

Copolyesters

The novel copolyesters of this invention may be prepared from appropriate dicarboxylic acids and dihydric phenols or their derivatives.

Useful Monomers

Dihydric phenols which may be used for preparing the copolyesters of this invention include chlorohydroquinone, methylhydroquinone, 2,6-dimethylhydroquinone and bis(4-hydroxyphenyl)ether or bis(methyl-4-hydroxyphenyl)-ether and the like. Useful acids are terephthalic acid and naphthalene-2,6-dicarboxylic acid. Phenolic reactants are employed preferably in the form of the corresponding diacetates. The dihydric phenols which provide formula I units are used in such relative amounts that they constitute from 60 to 85 mol % of the total amount of dihydric phenol present.

The preferred copolyester according to this invention is copoly[chloro-1,4-phenylene/oxybis(1,4-phenylene) terephthalate], 70/30. This and other useful copolyesters according to this invention are illustrated in the Examples.

The copolyesters of the invention form anisotropic melts and flow at temperatures below those at which rapid decomposition occurs to provide processibility into fibers and other shaped articles. The melts are believed to comprise domains of parallel aligned polymer chains which in the spinning process produce as-spun oriented fibers.

The fiber-forming copolyesters of this invention exhibit inherent viscosities of at least 0.5, measured as described hereinafter.

For small quantitites of material, a convenient method for demonstrating fiber-forming potential of these compositions is to melt a chip of polymer in the anisotropic melt-forming temperature range on a heated bar (e.g., a modified Dennis bar, see Sorenson, W. and Campbell, T. W. "Preparative Methods of Polymer Chemistry", Interscience Publishers, Inc., New York, 1961, p, 49–50), and slowly (~ 1 ft/sec) withdraw fibers from the melted pool. Such fibers usually are highly oriented and strong in contrast to fibers made from poly(ethylene terephthalate), a known melt spinnable polyester, by the same method.

Polymerization Conditions

The novel copolyesters of this invention may be prepared from appropriate monomers by melt polymerization techniques, preferably under anhydrous conditions in an inert atmosphere. For example, equimolar amounts of the reactant acid and the diacetate of the dihydric phenols are combined in a reaction vessel equipped with a stirrer, nitrogen inlet tube, and combined distillation head-condenser (to facilitate by-product removal). The reaction vessel and other equipment are dried and purged with nitrogen prior to use. The vessel and stirred contents, maintained under nitrogen, are heated during which time the reactants polymerize and the by-product (acetic acid) is removed via the distillation head-condenser and is collected. When the polymerization appears nearly complete, as indicated by the amount of acetic acid collected remaining constant, the molten polymer mass is placed under reduced pressure (e.g., 1 mm. Hg or less ) and is heated with nitrogen, at a higher temperature to facilitate removal of the remaining acetic acid and to complete the polymerization. The melt may then be removed, cooled, and allowed to solidify prior to purification and/or subsequent processing. Optionally, the molten polymer may be transferred directly to an appropriate apparatus for preparation of shaped articles, e.g., a spinning unit for fiber preparation.

For smaller scale polyester syntheses, e.g., in a polymer melt tube, stirring action may be formed by a stream of inert gas passing through the molten polymerization mixture. However, mechanical stirring is preferred.

Polymerization conditions (e.g., temperature, duration of heating, pressures, etc.) may be varied according to, e.g., the reactants employed and the degree of polymerization desired.

Anisotropic Melts

The anisotropy of these copolyester melts in the molten state facilitates attainment of high orientation, high strength, high initial modulus, and/or low shrinkage in fibers prepared from the melts, and contributes to the capacity of these fibers to increase in tenacity on heat treatment in an essentially relaxed state.

Optical anisotropy of the copolyester melts can be determined by modification of known procedures. It is well known that translucent optically anisotropic materials cause light to be transmitted in optical systems equipped with crossed polarizers [see, e.g., S. A. Jabarin and R. S. Stein, J. Phys, Chem. 77, 399 (1973)], whereas transmission of light is theoretically zero for isotropic materials. Thus, optical anisotropy can be determined by placing a sample of the polymer on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermooptical test (TOT) described below. The apparatus is similar to that described by I. Kirshenbaum, R. B. Isaacson, and W. C. Feist, Polymer Letters, 2, 897–901 (1964).

Shaped Article Preparation

The copolyesters in this invention are formed into useful shaped articles such as fibers, films, bars, or other molded objects, etc. by, e.g., pressing or by spinning, casting, or extruding the anisotropic melts thereof. Especially preferred are the highly oriented, strong fibers. For fiber preparation the molten polymer mass, obtained either directly from the melt polymerization of the copolymer-forming ingredients or via the melting of a plug or block of copolymer, is processed, e.g., through a melt spinning unit and extruded through a spinneret into a quenching atmosphere (e.g., air or nitrogen maintained at room temperature) and wound up. As used herein, the term "as-spun fiber" refers to a fiber which has not been drawn, stretched, or heat treated after extrusion and normal windup. In fact, the "as-spun fibers" of the anisotropic melts cannot be drawn in the usual sense, i.e., 100% or more.

Fibers may be prepared conveniently from single or multi-hole spinnerets. In the melt spinning cell, the melt zone temperature will be in the range of, e.g. from about 300° to 375° C, depending on the sample. Higher temperatures are used for samples exhibiting higher inherent viscosities or higher flow temperatures. Temperatures preferably are maintained above the flow temperature but, under pressure, fibers can be spun somewhat below the flow temperature since the latter is measured at essentially zero shear. Similarly, spinneret temperatures will be in the range of, e.g., from about 300° to 385° C depending on the melt zone temperature and the copolymer system. As shown in the examples, filtering screens may be employed in the spinneret pack. Air is preferred as a quenching medium for the fibers leaving the spinneret. The as-spun fibers may be wound up at speeds in the range of, e.g., from less than 100 m/min to 1,100 m/min or higher. The spin stretch factor selected (SSF, defined hereinafter) will depend on spinneret hole size and may range from 5 to 400. If desired, a finish may be applied to the as-spun fibers.

Films and bars may be prepared by conventional extrusion techniques.

It is preferred that the copolyesters of the invention have a flow temperature within the range of 200° C to 375° C. Copolyesters with flow temperatures in excess of 375° C are difficult to process (e.g., spin into useful fibers). Depending on structure, rapid decomposition of the polyesters may occur at higher temperatures, i.e., above 375° C.

Plasticizers may be used to assist in the formation of shaped articles from those copolyesters which exhibit high melting point and/or high values of inherent viscosity.

Fibers: Properties, Heat Treatment, Utility

As an example of products of the invention, as-spun fiber of copoly[chloro-1,4-phenylene/oxybis(1,4-phenylene) terephthalate] or copoly[methyl-1,4-phenylene/oxybis(1,4-phenylene) terephthalate] in the 85/15 to 60/40 range can be prepared with a tenacity of at least about 2 gpd., an initial modulus of at least 100 gpd., and an X-ray orientation angle of less than about 40°.

The as-spun fibers of this invention may be subjected to heat treatment while relaxed to provide fibers characterized by, e.g., higher strength and orientation. For example, the heat treated fibers ordinarily exhibit tenacities greater than about 10 grams per denier and often exceed 15 grams per denier. At 150° C. such fibers usually retain about one-half of their room temperature tenacity and modulus. They also retain a significant portion of their strength after ageing in rubber stock at elevated temperatures, and exhibit good transverse properties as measured by loop tensile values and flex resistance.

The foregoing properties favor the use of the fibers of this invention in, e.g., belts and carcasses of automobile tires, towing ropes, plastic reinforcement, knitted and woven fabrics, papers and other applications wherein a combination of high strength, low extensibility, and high initial modulus are required, e.g., in the preparation of ropes, hawsers, and cordage for marine usage as noted in U.S. Pat. No. 3,400,194.

In the heat-treating process, fiber samples, as skeins or on bobbins, may be heated in an inert atmosphere (e.g., nitrogen) under a variety of conditions. Heating is normally conducted for about 4 hours at temperatures approaching the fusion point but sufficiently below to prevent substantial interfilament fusion, i.e., yarns are rewindable. It is preferred that the maximum temperature be reached in a stepwise fashion. Total exposure time may be up to about 6–7 hours, including the time needed to reach succeeding higher temperature levels.

When the fiber samples are wound on bobbins it is preferred that a soft, heat resistant surface that yields at very low stress to present on the bobbin, e.g., a covering of Fiberfrax ® (batted ceramic insulation of the Carborundum Company). The inert atmosphere within the oven or other heat-treating chamber is continuously purged during the treating period by a flow of inert gas (e.g., nitrogen) through the oven sufficiently fast to remove by-products, e.g., acetic acid, from the vicinity of the fiber.

MEASUREMENTS AND TESTS

X-Ray Orientation Angle

The orientation angle (O.A.) values reported herein are obtained by the procedures described in Kwolek U.S. Pat. No. 3,671,542, using Method Two of that patent. For fibers of this invention, the arc used for orientation angle determination occurs at about 20° for $2\theta$. In the examples of specific $2\theta$ value is shown parenthetically after the O.A. value.

Inherent Viscosity

Inherent viscosity ($\eta_{inh}$) is defined by the following equation:

$$\eta_{inh} = \frac{\ln(\eta_{rel})}{C}$$

wherein ($\eta_{rel}$) represents the relative viscosity and C represents a concentration of 0.5 gram of the polymer in 100 ml. of solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C; the solvent is p-chlorophenol.

Solution is effected by vigorously shaking a sealed vial containing the mixture of polymer and solvent in a hot air bath (air temperature 225° C.) for one minute and then quickly cooling to 30° C.

Fiber Tensile Properties

Filament and yarn properties are measured by the procedures shown in Morgan U.S. Pat. No. 3,827,998, using fibers that have been conditioned for at least one hour. Tenacity, T, and Modulus, Mi, are given in grams per denier. Elongation, E, is given in percent. At least three breaks are averaged.

It should be noted that different values are obtained from single filaments (filament properties) and from multifilament strands (yarn properties) of the same sample. Unless specified otherwise all properties given herein are filament properties.

Optical Anisotropy

Optical Anisotropy may be measured by the method shown herein.

Spin Stretch Factor

The spin stretch factor is defined as follows:

$$S.S.F. = \frac{\text{Velocity of yarn at wind-up (ft./min.)}}{\text{Velocity of melt through spinneret (ft./min.)}}$$

where

Vel. of melt through spinneret =

$$\frac{\text{Rate of extrusion (cu.ft./min.)}}{\text{No. of spinneret holes} \times \text{cross-sectional area of one hole (sq. ft.)}}$$

TOT AND FLOW TEMPERATURE APPARATUS AND METHOD

The thermo-optical test (TOT) requires a polarizing microscope which should have strain-free optics and sufficiently high extinction with crossed (90°) polarizers to be capable of giving a background transmission specified below. A Leitz Dialux-Pol microscope was used for the determinations reported herein. It was equipped with Polaroid polarizers, binocular eyepieces, and a heating stage. A photodetector (a photometer sensor) was attached at the top of the microscope barrel. The microscope had a 32X, long working distance objective, and a Red I plate (used only when making visual observations with crossed polarizers; inserted at an angle of 45° to each polarizer). White light from an incandescent light source is directed through the polarizer, through the sample on the heating stage and through the analyzer to either the photodetector or the eyepieces. A slide permits transferring the image from eyepieces to photodetector. The heating stage used is one capable of being heated at 500° C. A "Unitron" model MHS vacuum heating stage (Unitron Instrument Co., 66 Needham St., Newton Highlands, Mass. 02161) was used. The photodetector signal is amplified by a photometer amplifier and fed to the Y-axis of and X-Y recorder. The system response to light intensity should be linear and the error of measurement within ± 1 mm. on the chart paper. The heating state is provided with two attached thermocouples. One is connected to the X-axis of the X-Y recorder to record stage temperature, the other to a programmed temperature controller.

The microscope is focused visually (with crossed polarizers) on a polymer sample prepared and mounted as described below. The sample, but not the cover slip(s), is removed from the optical path. The Polaroid analyzer of the microscope is removed from the optical path, the slide is shifted to transfer the image to the photodetector and the system is adjusted so that full-scale deflection (18 cm on the chart paper used) on the Y-axis of the X-Y recorder corresponds to 36% of the photometer signal. This is done by (1) adjusting the light souce intensity so that the photometer meter reads a value preselected so that it corresponds to a Y-axis reading on the recorder of 5 cm; (2) increasing the amplification of the photometer by a factor of 10. This results in the full scale recorder deflection of 18 cm corresponding to (18/50) X 100 or 36% of the photometer signal. The background transmission value is recorded with crossed (90°) polarizers and with the cover slip(s), but not the sample, in the optical path. The background transmission in the system used should be independent of temperature and should be less than about 0.5 cm on the chart paper.

The sample is preferably a 5 $\mu$m section microtomed with a diamond knife from a solid well-coalesced chip of pure polymer (e.g., as prepared in the examples, or by melting and coalescing under nitrogen some of the ground polymer) mounted in epoxy resin. For materials that shatter when microtomed, duplicate films (about 5 $\mu$m. thick) of polymer are prepared by heating a few particles of pure polymer between each of two sets of cover slips enclosed between a pair of microscope slides. By heating this assembly quickly above the flow temperature (independently determined on a polymer particle) and applying pressure with a wooden tamp alternately over each sample, thin liquid films of polymer are produced. These films solidify when cooled.

One solid film between cover slips is used for the TOT procedure; the other is used for a flow temperature measurement.

The sample section is pressed flat between cover slips. One cover slip is removed and the sample on the remaining cover slip is placed (glass down) on the heating stage. The light intensity is set and the background transmission is measured as described above. The sample (section, or film between cover slips) then is positioned so that essentially all the light intercepted by the photodetector will pass through the sample. With the sample between crossed (90°) polarizers and under nitrogen, the light intensity and temperature are recorded on the X-Y recorder as the temperature is raised at a programmed rate of about 14° C/min. from 25° C. The sample temperature is obtained from the recorded temperature by use of a suitable calibration curve.

The flow temperature of copolymers or fibers is observed visually between crossed (90°) polarizers on the heating stage assembly previously described for the TOT procedure. Fiber samples for examination are prepared by cutting the fiber with a razor blade and mounting the samples on a cover slip. Flow temperature is that temperature at which the sharp edges of a tiny chip or particle of polymer or the cut fiber edge become rounded. If the melt viscosity is low enough, flow is observed. When a film is used in the TOT procedure, a duplicate film is used for the flow temperature determination. Flow temperature is that temperature at which the film edges change contour or the polymer flows. Observations usually are made at a heating rate of 14° C/min. In a few cases, where rapid further polymerization occurs, a faster rate, about 50° C/min, is recommended.

It should be understood that the flow temperature of these copolymers or fibers thereof may vary depending on their history. For example, stepwise heating ordinarily raises the flow temperature. This permits heat treatment at temperatures above the initial flow temperature but below the newly attained flow temperature level. The reported flow temperatures are those determined by these procedures.

Intensity Traces

The melt-forming copolymers useful for fibers in this invention are considered to form anisotropic melts according to the thermooptical test (TOT) if, as a sample is heated between crossed (90°) polarizers to temperatures above its flow temperature, the intensity of the light transmitted through the resulting anisotropic melt gives a trace whose height (1) is at least twice the height of the background tramsmission trace on the recorder chart and is at least 0.5 cm greater than the background transmission trace, or (2) increases to such values. Curve B of the FIGURE illustrates a type of intensity trace usually obtained for systems forming anisotropic melts.

The intensity of light transmitted through the analyzer when isotropic melts (the sample should be completely melted) are placed between crossed (90°) polarizers is essentially that of the background transmission (that obtained when the sample but not the cover slip is outside the field of view with 90° crossed polarizers). As the melt forms, the intensity of the light transmission (1) is essentially that of the background transmission or (2) decreases to such values from a higher value. Curve A of the FIGURE illustrates an intensity trace of a polymer forming an isotropic melt.

EXAMPLES

Example 1

This example illustrates preparation of copoly[chloro-1,4-phenylene/oxybis(1,4-phenylene) terephthalate], (70/30). Strong fibers with desirable properties are demonstrated.

Part A

In a 500 ml. round bottom 3-necked flask equipped with a glass stirrer, bleed tube for nitrogen, and a distillation head are placed chlorohydroquinone diacetate (64 g., 0.28 mole), bis(4-acetoxyphenyl)ether (34.3 g., 0.12 mole), and terephthalic acid (73 g., 0.44 mole). These stirred ingredients, under nitrogen, are heated between 270°–280° C. for about 2¼ hours in a Woods-metal bath; the acetic acid by-product distills out and is collected. During the next 25 min., the reaction temperature is increased to about 320° C. Then the nitrogen flow is halted and the reaction mixture placed under a reduced pressure of about 1.0–1.5 mm. Hg. for the next 15 minutes; the reaction temperature reaches 324° C. The heating bath is removed and the reaction system, still under vacuum, is allowed to cool. The copolymeric product is collected and extracted with acetone; $\eta$inh = 1.2. A similarly prepared sample exhibits optical anisotropy above 301° C. (TOT).

Part B

A plug of the above-prepared copolymer is placed in a melt spinning cell and extruded into air through a 5-hole spinneret (diameter of each hole = 0.023 cm.; spinneret temperature range = 332°–336° C.; melt zone temperature = 324° C. The spinneret unit contains filtering screens. Several bobbins of yarn are collected at these windup speeds: 823 m./min. (bobbin "A"), and 1120 m/min (bobbin "B").

Filaments from bobbin "B" exhibit these properties: T/E/Mi/Den. = 3.8/2.3/275/2.1; Fiber O.A. = 24° (18.6°).

Yarns from bobbin "A" are plied several times and wound on a Fiberfrax ®-wrapped bobbin and are heated relaxed, under nitrogen in an oven under these successive temperatures (1 hr. at each temperature, oven initially at 25° C.); 280° C., 290° C., 300° C., 310° C. The treated yarn exhibits these properties: T/E/Mi/Den. = 19.8/5.3246191.5; O.A. = 20° (19.2°).

Example 2

This example illustrates preparation of copoly[methyl-1,4-phenylene/oxybis(1,4-phenylene) terephthalate], (7/3), and an optically anisotropic melt thereof. Strong fibers with desirable properties are demonstrated.

Part A

In a 250 ml. round-bottom 3-necked flask equipped with a glass stirrer, bleed tube for nitrogen, and a distillation head are placed methylhydroquinone diacetate (29.1 g., 0.14 mole), bis (4-acetoxyphenyl)ether (17.2 g., 0.06 mole), and terephthalic acid (36.5 g., 0.22 mole). These stirred ingredients, under nitrogen, are heated between 265°–280° C. for about 1 hour in a Woods-metal bath; the acetic acid by-product distills out and is collected. During the next 1¼ hours the temperature is gradually increased to 320° C. Then the nitrogen flow is halted and the reaction mixture placed under a reduced pressure for the next 35 minutes; the reaction temperature is maintained at 320° C. The heating bath is removed and the reaction system, still under vacuum, is allowed to cool. The copolymeric product is collected. It is optically anisotropic in the melt above 307° C. (TOT); ηinh = 0.85.

Part B

A plug of the above-prepared copolymer is placed in a melt spinning cell and extruded into air through a 5-hole spinneret (diameter of each hole = 0.023 cm.; spinneret temperature range = 328°-340° C; melt zone temperature 324°-330° C.). A bobbin of yarn is collected at a windup speed of 571 m./min. Filaments from this bobbin exhibit these properties: T/E/Mi/Den. = 3.2/2.7/187/4.4; O.A. = 35° (18.8°).

A yarn sample collected from the above fiber is wound on a "Fiberfrax"-wrapped bobbin and is heated relaxed, under nitrogen in an oven under these successive temperatures (1 hour at each temperature, oven initially 25° C.) 280° C., 290° C., 300° C. The treated yarns exhibit these properties: T/E/Mi = 9.9/3.6/248; O.A. = 22° (19.3°).

Example 3

This example illustrates preparation of copoly [methyl-1,4 -phenylene/oxybis(1,4-phenylene) 2,6-naphthalate] (70/30). Strong fibers are prepared from the copolymer.

Part A

The copolymer is prepared in an analogous manner to the preparation of Examples 1 and 2 from methylhydroquinone diacetate (32.06 g, 0.154 mole), bis (4-acetoxyphenyl)ether (18.9 g, 0.066 mole), and naphthalene-2,6-dicarboxylic acid (43.24 g. 0.20 mole). The product, after extraction with ethyl alcohol followed by drying in an oven, has an inh of 1.9.

Part B

A plug of the purified copolymer is melt-extruded into air through a 1-hole spinneret (hold diameter = 0.023 cm, melt zone temperature = 335° C, spinneret temperature range varies between 340°-360° C) and wound up. After the fiber is backwound, a small sample (initially wound up at 658 m/min, spun at 360° C) is skeined and heated in a nitrogen-swept oven under these successive conditions: room temperature to 150° C/1 hr, 250° C/24 hr, and 300° C/15 hr (temperature changes to the cited levels are reached as quickly as possible). After this heat treatment, the filaments exhibit these properties = T/E/Mi/Den. = 15.7/8.3/213.2/7.5.

Example 4

This example illustrates preparation of copoly [methyl-1,4-phenylene/oxybis(methyl-1,4-phenylene) 2,6-naphthalate] (70/30) and strong fibers thereof.

The copolymer is prepared in an analogous manner to the preparation of Examples 1 and 2 from methylhydroquinone diacetate (14.43 g. 0.0693 mole), bis(methyl-4-acetoxyphenyl)ether (9.31 g, 0.0296 mole), and naphthalene-2,6-dicarboxylic acid)(20.78 g, 0.0961mole). The bis(methyl-4-acetoxyphenyl)ether used is an isomeric mixture having this distribution of methyl substitutents on the aromatic rings: 2,3'-dimethyl: 43.3%, 2,2'-dimethyl: 49.3%, 3,3'-dimethyl: <2% ; the remainder is undefined.

Fibers of the copolymer up to 10 feet long are readily drawn by hand from the melt. After a monofilament sample is heated at 320° C for 4.5 hr in a nitrogen-swept oven, the filament exhibits these properties: T/E/Mi/Den. = 10.9/7.5/197.3/3.8. What is claimed is:

1. A fiber-forming melt-spinnable copolyester capable of forming an anisotropic melt consisting essentially of units of the formula:

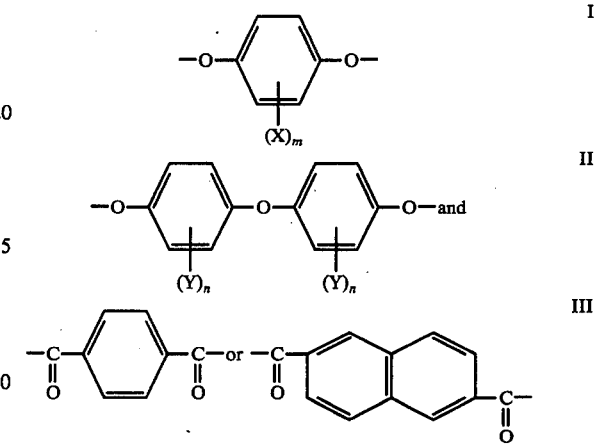

wherein X is selected from the group of chloro and methyl; $m$ is 1 or 2; Y is methyl; $n$ is 0 or 1; the mol ratio of formula I units to formula II units is within the range of from about 85/15 to 60/40.

2. Copoly[chloro-1,4-phenylene/oxybis(1,4-phenylene) terephthalate](85/15 to 60/40) according to claim 1.

3. Copoly[methyl-1,4-phenylene/oxybis(1,4-phenylene) terephthalate] (85/15 to 60/40) according to claim 1.

4. Copoly[methyl-1,4-phenylene/oxybis(1,4-phenylene) 2,6-naphthalate] (85/15 to 60/40) according to claim 1.

5. Copoly[methyl-1,4-phenylene/oxybis(methyl-1,4-phenylene) 2,6-naphthalate] (85/15 to 60/40) according to claim 1.

6. An anisotropic melt of the polyester of claim 1.

7. A fiber of the polyester of claim 1.

8. A fiber of the polyester of claim 2.

9. A fiber of the polyester of claim 3.

10. A fiber of the polyester of claim 4.

11. A fiber of the polyester of claim 5.

12. A shaped article of the polyester of claim 1.

13. An as-spun fiber of the copolyester of claim 1 having a tenacity of at least 2 gpd., an initial modulus of at least 100 gpd. and an orientation angle of less than about 40°.

* * * * *